United States Patent [19]
Johnstead

[11] Patent Number: 5,056,389
[45] Date of Patent: Oct. 15, 1991

[54] PORTABLE OPEN TURNING LATHE

[76] Inventor: Park L. Johnstead, 17100 SW. Bryant Rd., Lake Grove, Oreg. 97035

[21] Appl. No.: 576,618

[22] Filed: Aug. 30, 1990

[51] Int. Cl.[5] .............................................. B23B 5/04
[52] U.S. Cl. ....................................... 82/128; 82/113; 409/177; 409/179
[58] Field of Search ................. 82/128, 104, 107, 113; 409/177–179, 175, 296; 51/241 R, 241 B, 241 S, 179; 144/133 R, 136 H

[56] References Cited

U.S. PATENT DOCUMENTS

| | | | |
|---|---|---|---|
| 1,054,607 | 2/1913 | Pearce | 82/128 |
| 1,888,664 | 11/1932 | Geddes et al. | 51/179 X |
| 4,327,613 | 5/1982 | Melby | 82/128 |
| 4,922,772 | 5/1990 | Silk | 82/128 |

Primary Examiner—Steven C. Bishop
Attorney, Agent, or Firm—Robert L. Harrington

[57] ABSTRACT

A portable lathe for performing machining operations on a stationary member. The lathe is of split construction permitting the lathe to be mounted on the member from the side of the member. Each of the end housings have removable sections that provide a side entrance to the bores of the housings. Parallel guide ways connect the end housings and support a moveable carriage assembly. The carriage assembly rotatably supports a rotating tool holder and carrier on a unique roller arrangement simplifying construction. The carriage assembly has removable support struts and the carrier and tool holder ring are splitable which provides a side entrance to the bore of the carriage assembly. The lathe is secured and aligned to the member to be machined by adjustable jaws provided on the end housings. Twin leadscrews provide motion to the carriage assembly and reduce the twisting and deflection experienced with a single leadscrew.

12 Claims, 6 Drawing Sheets

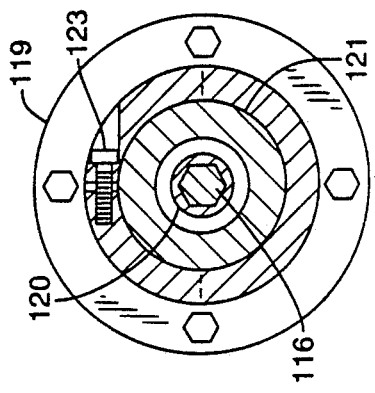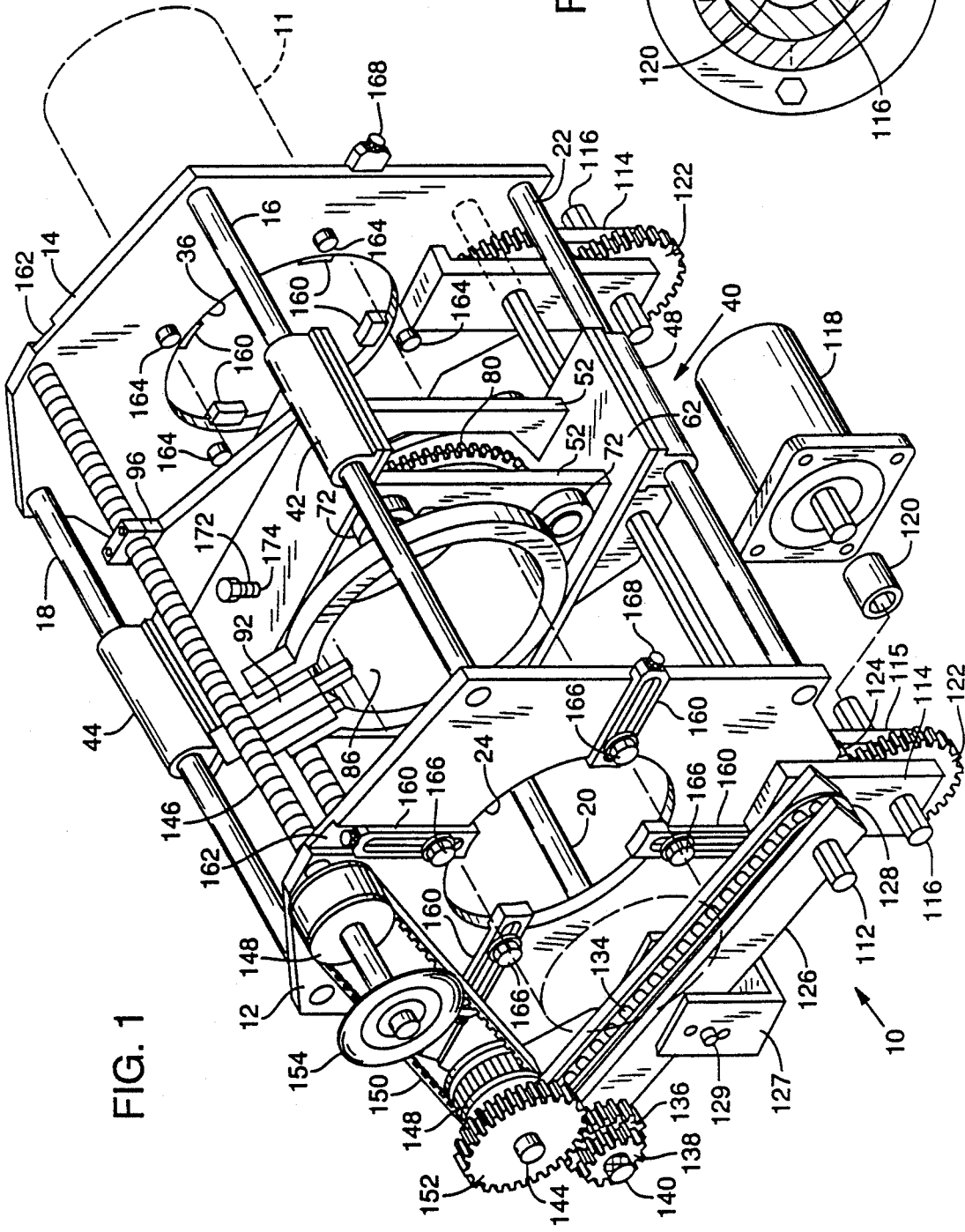

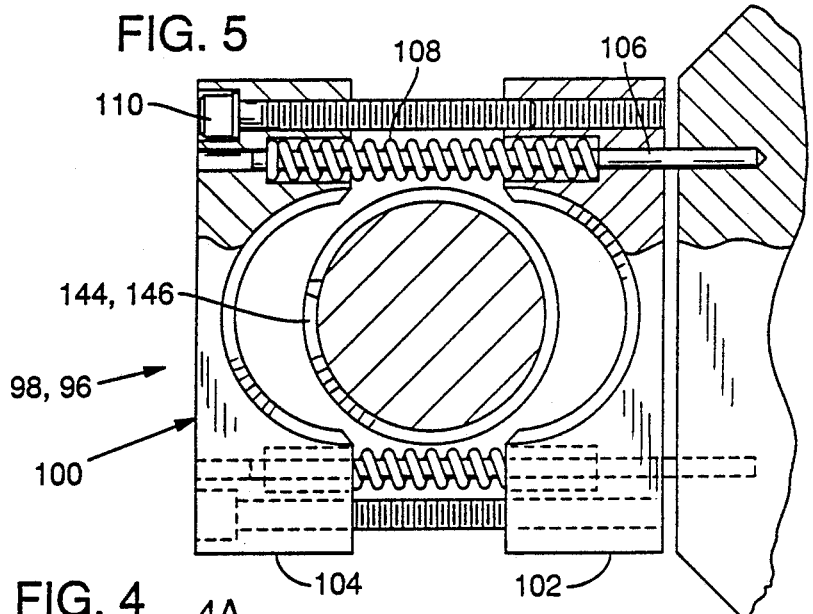
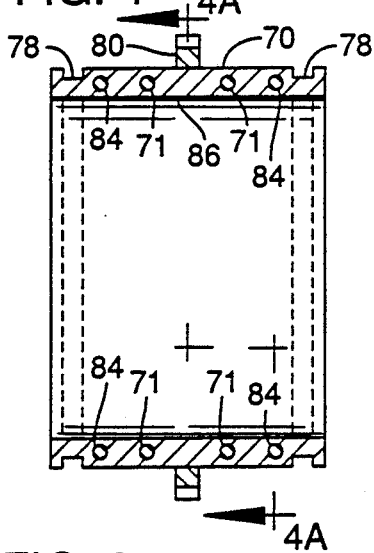
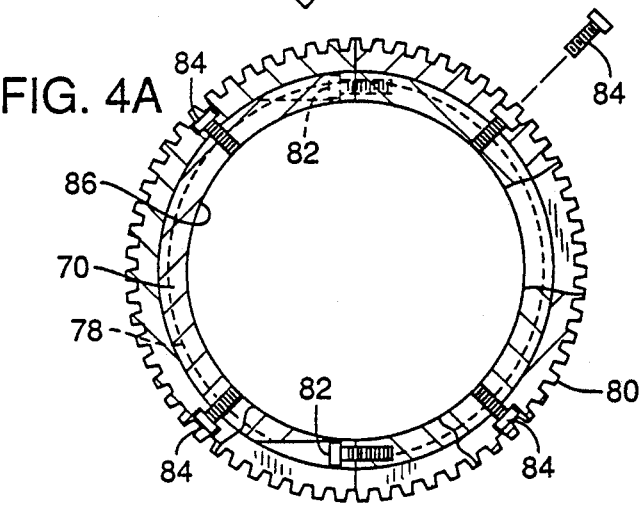
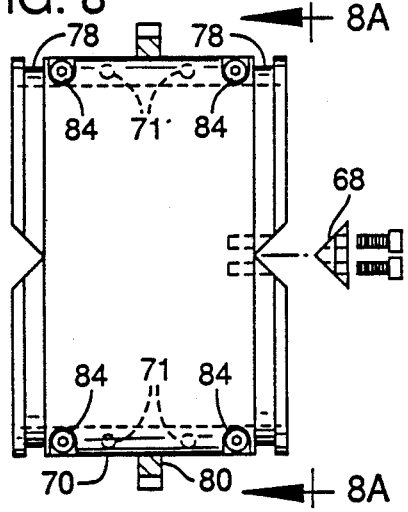
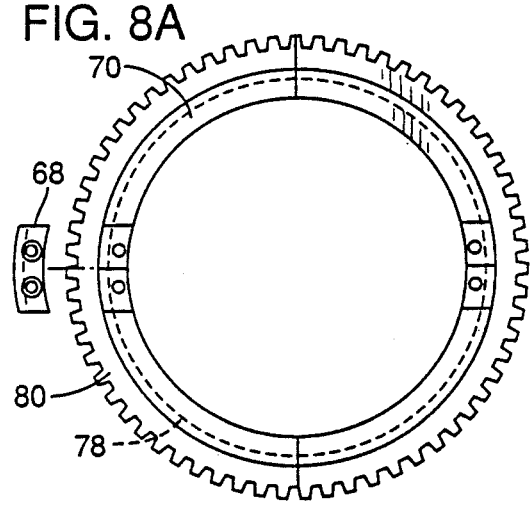

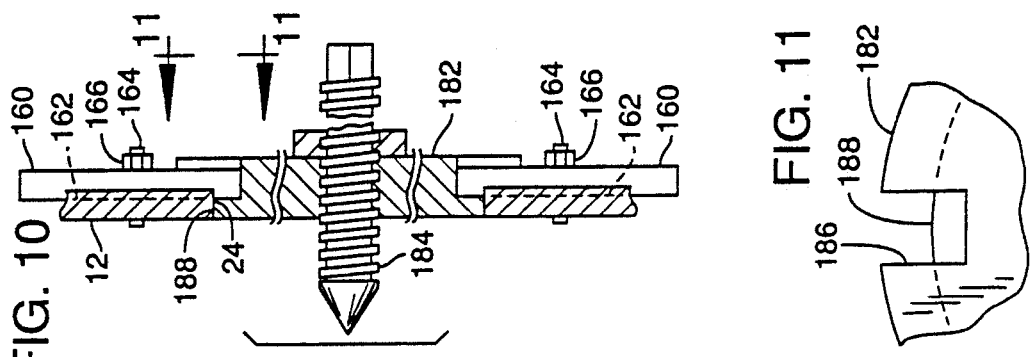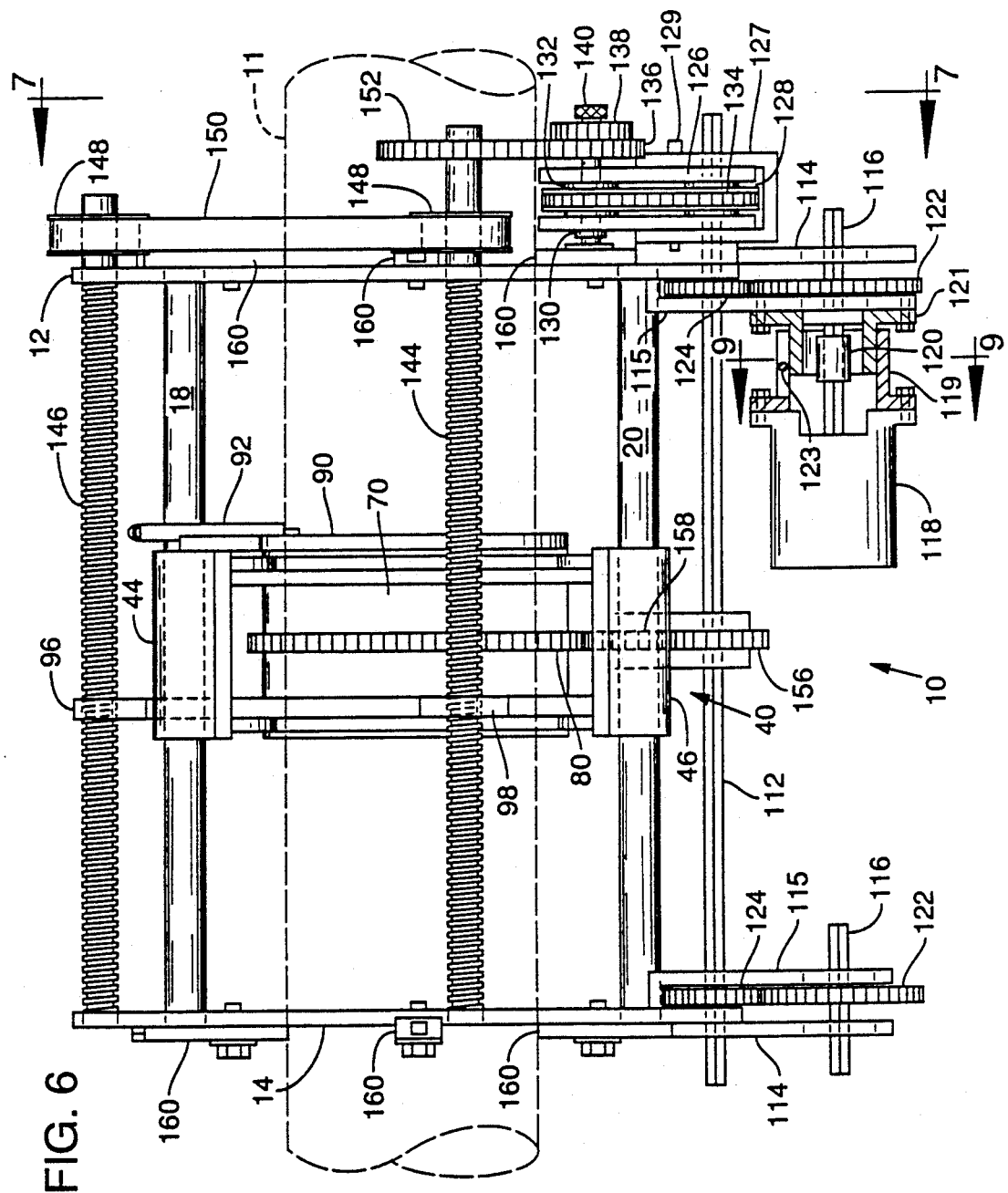

PORTABLE OPEN TURNING LATHE

BACKGROUND INFORMATION

1. Field of the Invention

This invention relates to portable turning lathes utilized to machine large shafts and the like and in particular it relates to a portable lathe that can be mounted from the side of the shaft as well as from the end of the shaft for machining a section intermediate the shaft ends.

2. Background of the Invention

There are many types of lathes on the market with the majority having a common factor. A member to be machined is brought to and positioned in a holding apparatus provided on the lathe. The member is rotated by the headstock spindle of the lathe and machining operations are performed.

There are a number of applications where due to the size or nature of the work piece, it is not feasible to transport the work piece and instead it is desirable to have the capability of transporting the lathe to the work piece and to have the machining operations performed without rotating the work piece. This applies to situations such as where a large shaft is assembled to a unit by numerous and cumbersome structure. One example is a wheel supporting spindle on the end of an axle structure of a truck. When a bearing failure damages the spindle, it takes many hours to remove the axle assembly from the vehicle. Additionally, a very large lathe is required to handle the axle assembly for remachining. There are also many situations where the work piece is in a locality that does not have a machine locally available to perform the machining operations required. The workpiece then must be shipped, often hundreds of miles at great expense, to a machine shop having a machine with the capability to perform the machining operations.

A portable lathe as disclosed in U.S. Pat. No. 4,327,613 issued to Melby may be utilized to machine the spindles on axles without the requirement of disassembly. The lathe, however, is limited in that it will perform machining operations only on an end portion of the spindle or similar member such as a shaft.

There are numerous applications where machining is required on a shaft other than its end portions. Until now there has not been a machine that was mountable on the shaft other than by sliding the lathe over the end of the shaft. This meant that the shaft to be machined had to be removed from it supportive structure so the lathe could be mounted on the shaft. Even at that it could only address an end portion of the shaft. When a shaft was constructed with an eccentric or crank arm or other obstruction, the lathe may not have a large enough center opening to permit the lathe to pass over the device. Thus the lathe would not have the capability of being positioned to the section of the shaft that required machining even when the shaft was removed from the structure.

The present invention fills that need.

BRIEF SUMMARY OF THE INVENTION

The present invention is a portable lathe for performing machining operations on a stationary member, such as a shaft, including turning, threading, facing, chamfering and related operations.

In a preferred embodiment, the lathe is provided with a side opening that permits attaching the lathe to the shaft without having to slide the lathe over an end of the shaft. The main end frames, carriage and tool carrier have removable sections that provide the side opening. The side opening extends to the central bore of the lathe. This permits the lathe to address a portion of a shaft other than its ends without having to disturb any structure fitted to or supportive of the ends.

The lathe is secured to the shaft by multiple adjustable jaws mounted on the end housings. The jaws are also utilized to align the lathe relative to the shaft for proper cutting tool runout relative to the center line of the shaft.

The lathe has a rotating cutting tool holder mounted on a moveable carriage for performing the machining operations. Industry standard cutting tools are mountable in the tool holder to perform the turning, threading, facing and related turning operations.

The carriage linear feed, or as often referred to as longitudinal feed, is provided by dual leadscrews. The dual leadscrews eliminate the twisting and deflecting experienced with a single leadscrew.

Other advantages of the present invention will be apparent from the detailed description and the drawings.

BRIEF DESCRIPTION OF THE DRAWINGS

FIG. 1 is a perspective view of a lathe of the present invention mounted on a member to be machined;

FIG. 4 is sectional side view of a carrier and FIG. 4A is a front sectional view of the carrier as viewed on view lines 4A—4A of FIG. 4;

FIG. 5 is a view of a split-nut;

FIG. 6 is a side view of the lathe of FIG. 1;

FIGS. 8 and 8A are additional views of the carrier, FIG. 8 is a side view and FIG. 8A is a view as viewed on view lines 8A—8A of FIG. 8;

FIG. 9 is a view of the motor coupler as viewed on view lines 9—9 of FIG. 6;

FIG. 10 is a view of the tailstock assembly installed in an end housing of the lathe; and FIG. 11 is a partial view of the tailstock flange as viewed on view lines 11—11 of FIG. 10.

DESCRIPTION OF THE PREFERRED EMBODIMENT

Refer now to FIG. 1 of the drawings. The figure illustrates a preferred embodiment of a portable open side lathe 10 for performing machining operations on a stationary member such as a shaft. The lathe 10 has a split frame construction which enables the lathe to be mounted from the side of the member 11 to be machined as well as being mountable by sliding the lathe over the end of the member. As shown, a member 11 to be machined, is received in the center through bore of the lathe 10.

Figure 2:
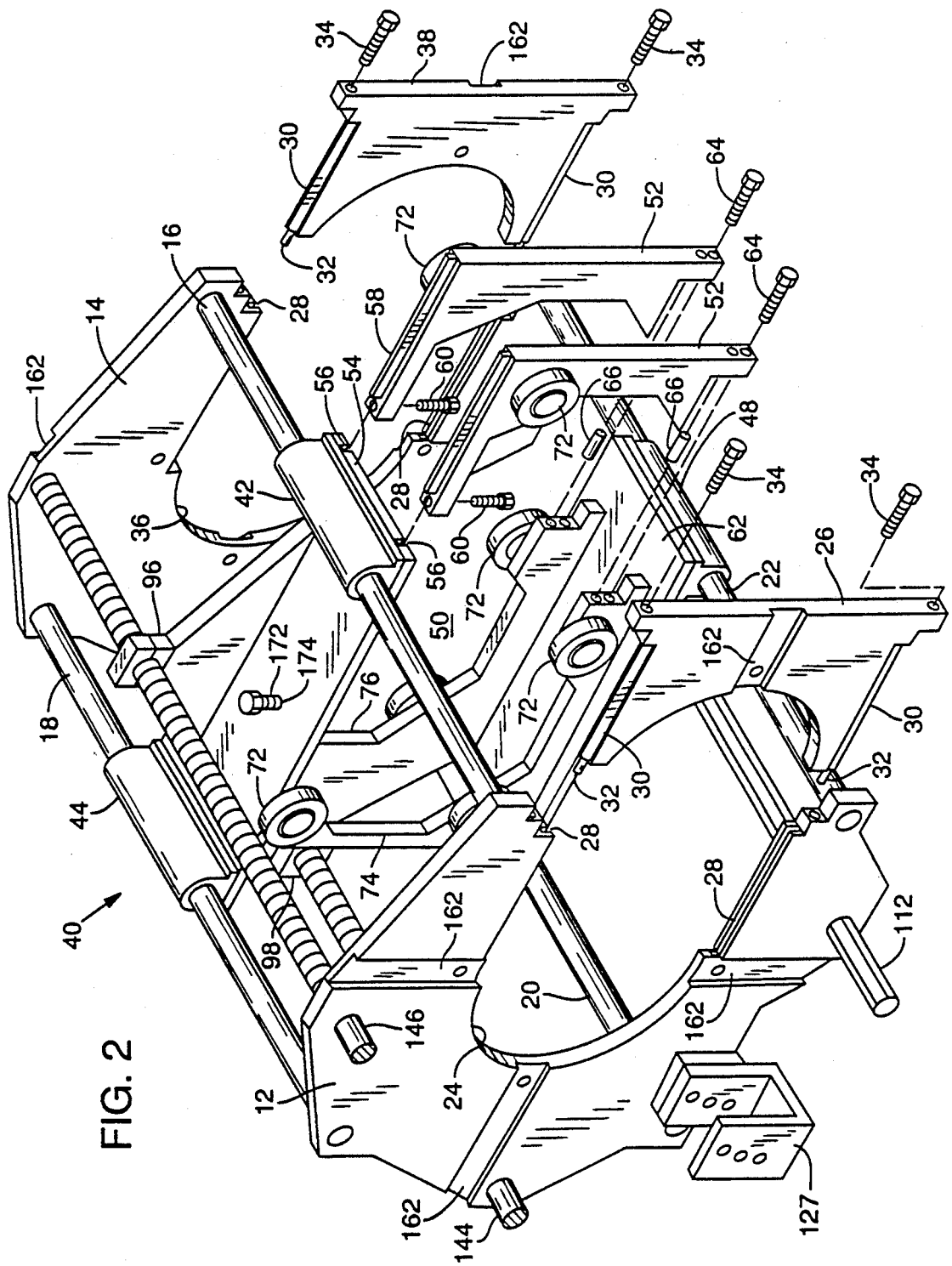
FIG. 2 is a view showing the split construction of the frame and carriage assembly of the lathe of FIG. 1 with parts removed for clarity.
Figure 3:
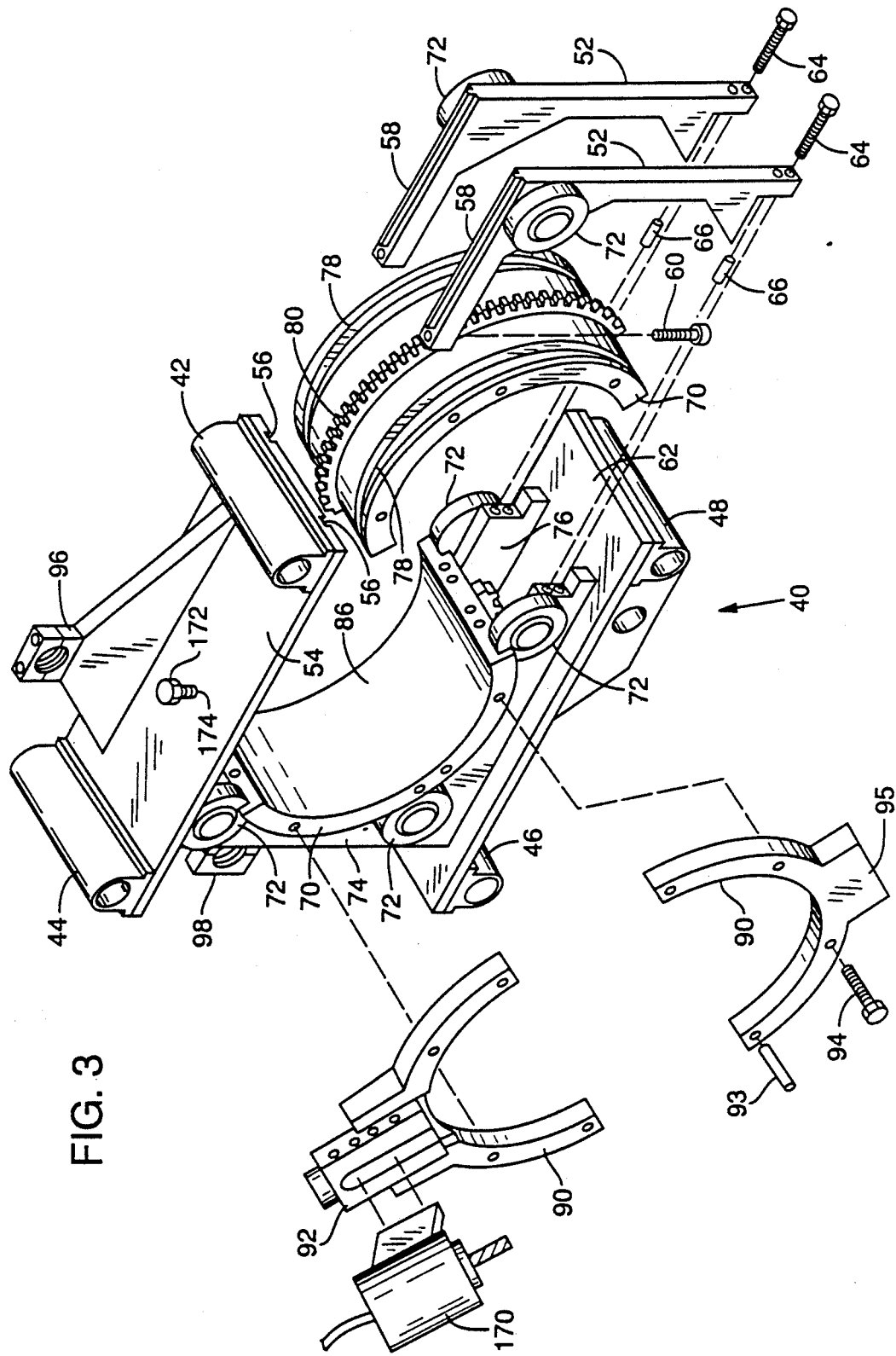
FIG. 3 is a view showing the split construction of the carriage assembly.

The parting lines and the construction details of the split construction are not shown in FIG. 1 in order to simplify the drawing. FIGS. 2 and 3 (with parts removed) clearly show the details.

Refer now to FIG. 2 of the drawings. This figure shows the split construction of the lathe 10. Note that the drive train and other parts have been removed for clarity. The lathe 10 has end housings 12 and 14 spaced at a distance from each other and rigidly joined by parallel guide ways 16, 18, 20 and 22. One end of each guide way 16, 18, 20 and 22 is rigidly attached to the end housing 12 and the opposite end of each guide way 16, 18, 20 and 22 is attached to the housing 14.

End housing 12 has a central through bore 24 and a removable section 26 that, when removed, provides access (i.e., a side opening or entrance) to the bore 24. As shown, the section 26 is fitted to the housing 12 by a tongue and groove arrangement, with formed grooves 28 in the housing 12 receiving the formed tongues 30 of the section 26. The section 26 is further aided in location on housing 12 by dowels 32 positioned at the end of the grooves 28 as shown. The section 26 is retained to the housing 12 by fasteners 34, preferably socket head cap screws.

End housing 14 has a central through bore 36 and a removable section 38 that, when removed, provides access (i.e., a side opening or entrance) to the bore 36. As shown, the section 38 is fitted to the housing 14 by a tongue and groove arrangement, with formed grooves 28 in the housing 14 receiving the formed tongues 30 of the section 38. The section 38 is further aided in location on housing 14 by dowels 32 positioned at the end of the grooves 28 as shown. The section 38 is retained to the housing 14 by fasteners 34, preferably socket head cap screws.

A carriage assembly 40 is slidably mounted on the guide ways 16, 18, 20 and 22 on linear bearings 42, 44, 46 and 48 for linear (longitudinal) movement between the end housings 12 and 14. The carriage 40 has a central opening (cavity) indicated generally by numeral 50 for receiving a rotatable tool carrier as will be detailed later. The carriage 40 has two removable support struts 52 that, when removed, provide a side opening to the central opening 50 of the carriage. The struts 52 are fitted to the carriage by a tongue and groove arrangement with a formed grooves 56 in the upper frame 54 of the carriage 40 receiving the tongues 58 of the struts 52. The struts 52 are secured to the upper frame 54 by fasteners 60, preferably socket head cap screws. The struts 52 are secured to the lower frame 62 of the carriage 40 by fasteners 64, preferably socket head cap screws. Dowels 66 are provided for aligning each strut 52 to the lower frame 62 of the carriage 40.

Refer now to FIG. 3 which further illustrates the carriage assembly 40. Rotatably mounted on the carriage 40 is a rotatable carrier 70. As shown, the carrier 70 is of tubular construction and is splitable into two sections. The carrier 70 is rotatably supported on support rollers 72 rotatably mounted on the support members 74 and 76 and the support struts 52 of the carriage 40. The rollers 72 fit in the peripheral grooves 78 formed in the carrier 70. The carrier 70 is thus fitted within the cavity 50 (referenced in FIG. 2) of the carriage 40. A gear 80 is fitted to the external periphery of the carrier 70 and is splitable in the same manner as the carrier.

The carrier 70 is further illustrated in FIGS. 4, 4A and FIGS. 8 and 8A. They show the two sections of the carrier 70 accurately aligned by dowels 71 and fastened to each other by multiple fasteners 82, preferably threaded cap screws. The gear 80 is attached to the carrier 70 by fasteners 84. Note that the parting line of the carrier 70 and of the gear 80 are coincident so that the gear 80 does not have to be removed from the carrier 70 when splitting the assembly to receive the member 11 to be machined. Triangular inserts 68, as shown in FIGS. 8 and 8A are provided at each intersection of the grooves 78 with each parting line of the carrier 70. The angled inserts 68 provide a smooth transition for the rollers 72 encountering the part lines of the carrier. The inserts 68 are accurately located by dowels and secured in position by threaded fasteners in a conventional manner. As shown, the carrier 70 when assembled, has a central through bore 86 for receiving the member 11 to be machined.

Referring again to FIG. 3, an adjustable tool holder ring 90 is shown split into two sections. The ring 90 is mountable on either end of the carrier 70 and has an adjustable tool holder 92. The tool holder 92 is provided with micrometer adjustment in a conventional manner. As shown, the tool holder ring 90 is also of split construction and is mounted to the carrier by threaded fasteners 94 and dowels 93. A counter weight 95 is provided on the ring 90 opposite the tool holder 92 to counterbalance the weight of the tool holder 92.

A linear (longitudinal) feed nut bracket 96 is fixedly mounted to the upper frame 54 of the carriage 40. A linear (longitudinal) feed nut bracket 98 is fixedly mounted to the support member 76 of the carriage 40. The feed nut brackets 96 and 98 each retain a split nut assembly 100 (see FIG. 5) that will engage the leadscrews (144, 146) to provide linear motion to the carriage 40 when the leadscrews are rotated either manually by the handwheel or powered by the drive motor. The nuts are of split construction so they may be disengaged from the leadscrews for manual movement of the carriage 40 between the housings 12 and 14. The nut assembly 100 has two half nuts 102 and 104 that are threaded in a conventional manner and are slidably mounted on dowels 106. Springs 108 provide a biasing force to separate the half nuts 102 and 104. Drawbolts 110 are provided to draw the half nuts 102 and 104 toward each other with the threaded portion of the half nuts 102 and 104 threadably engaging the leadscrew.

Refer now to FIGS. 1 and 6 of the drawings. A hexagon drive shaft 112 extending beyond the ends of the housings 12, 14, is rotatably mounted in the end housings 12 and 14 in a conventional manner. The end of the drive shaft 112 extending beyond the housing 12 is suitably machined to accept the demountable attachment of a handwheel 154. Support brackets 114, 115 are demountable attached to the end housing 12 and extend as shown in the figure to support the hexagon jack shaft 116. The jack shaft 116 is rotatably supported on the brackets 114, 115 and extends beyond the brackets 114, 115 to accept the demountable coupling of a drive motor 118. The drive motor 118 is coupled to the jack shaft 116 by a coupling 120 in a convention manner and is preferably a variable speed reversible hydraulic motor. Note that the motor 118 is mountable on either end of the jack shaft 116. Alternative mounting positions are at either end of the drive shaft 112 extending beyond the housings 12 and 14 and also by interchanging the support brackets 114, 115 from the housing 12 to the housing 14 or providing a another set of support brackets 114, 115 on the housing 14. The mounting adapter 121 is demountably attached to the bracket 115 as shown in FIG. 6. The adapter 121 has a sleeve that enters a split sleeve on motor coupler 119. The split sleeve on coupler 119 is fixedly secured to the sleeve of the mounting adapter 121 by tightening an adjusting bolt 123 to fixedly secure the motor 118 in position. The motor 118 is mountable at the other mounting positions in the same fashion.

An input drive gear 122 is fixedly mounted on the jack shaft 116 and is in mesh with a driven gear 124 fixedly mounted on the drive shaft 112. A pair of support arms, hereafter referred to as a swing arm 126, are pivotally bearing mounted on the end of the drive shaft 112 extending beyond the housing 12. A drive sprocket 128 is fixedly mounted on the drive shaft 112 between the arms of the swing arm 126. As shown, the opposite end of the swing arm 126 supports a jack shaft 130 that is rotatably mounted on the swing arm 126. A driven sprocket 132 is fixedly mounted on the jack shaft 130 and is coupled to the drive sprocket 128 by an endless drive chain 134. A set of quick change gears 136, 138 are demountably attached, preferably keyed, to the jack shaft 130. The gears 136, 138 are retained on the shaft 136 by a fastener 140. The quick change gears 136 and 138 are interchangeable with respect to position on the jack shaft 136 to provide differing feed ratios in a conventional manner.

Note that only two change gears are described in the preferred embodiment for simplification and clarity of the drawings. It is apparent that additional change gears may be readily utilized to provide other feed ratios. The change gears are typically provided for threading capability such as for the common pitches of 8, 12 and 16 threads per inch. Change gears may also be provided for other thread standards, such as metric.

As shown in FIG. 1 (and 2, 6, and 7), the lathe 10 has two leadscrews 144 and 146. Both are rotatably bearing mounted in a conventional manner on the end housings 12 and 14 with leadscrew 144 aligned with feed nut bracket 98 of the carriage 40 and leadscrew 146 aligned with feed nut bracket 96 of the carriage 40. A pulley 148 is mounted near the ends of each of the leadscrews 144 and 146 extending beyond housing 12 and the leadscrews are coupled to rotate in unison by a timing belt 150 engaging the pulleys 148. A leadscrew drive gear 152 is mounted on the end of the leadscrew 144 and is aligned to mesh with one of the quick change gears 136, 138.

The swing arm 126 is pivoted about the axis of the hexagon drive shaft 112 and preferably has three pivotal locating positions provided by the detent bracket 127 and lynch pin 129. One of the positions will mesh the drive gear 152 with the change gear 136 when gear 136 is positioned on the jack shaft in alignment with the drive gear 152. The second position will mesh the drive gear 152 with the change gear 138 when gear 138 is positioned on the jack shaft in alignment with the drive gear 152. The third position is the disengaged or neutral position where the drive gear 152 is out of mesh with either of the gears 136, 138 aligned.

A handwheel 154 is provided that is attachable to the ends of the leadscrews 144 and 146 for manually rotating the leadscrews to provide a linear feed mode for the carriage 40. The handwheel 154 is usually utilized when the swing arm 126 is in the neutral position. The handwheel 154 is also attachable to the drive shaft 112 to provide rotation of the carrier and is an added benefit to aid in the setup of the lathe on a shaft. As shown in FIG. 1, the handwheel is demountably attached to the leadscrew 146.

A drive gear 156 (best seen in FIGS. 6 and 7) is slidably mounted on the drive shaft 112 and is retained by the carriage 40 to slidably move along the drive shaft 112 as the carriage is moved between the end housings 12 and 14. The drive gear 156 is in mesh with and drives an idler gear 158 which in turn is in mesh with and drives the gear 80 to rotate the carrier 70 when the drive shaft 112 is rotated. The idler gear 158 is adjustable relative to the drive gear 156 and the gear 80 to eliminate backlash.

Figure 7:
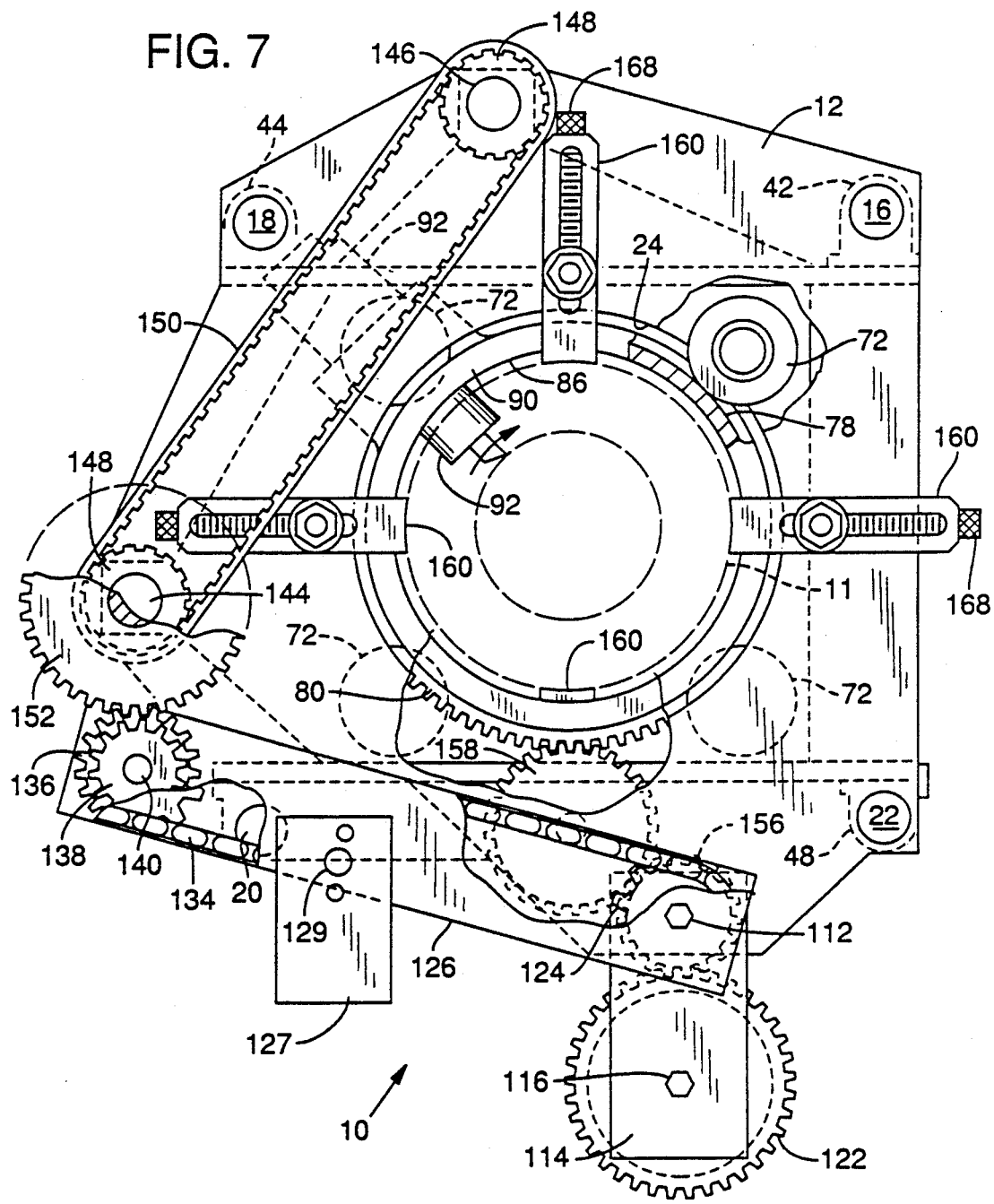
FIG. 7 is an end view of the lathe as viewed on view lines 7—7 of FIG. 6.

To facilitate affixing (i.e., the securing and the aligning) of the lathe 10 to the member 11 to be machined, adjustable chuck jaws 160 are provided (see FIGS. 1 and 7). The jaws 160 fit in formed grooves 162 (best seen in FIG. 2) in the end housings 12 and 14 (including the removable sections 26 and 38) as shown in FIG. 2. The jaws 160 are retained in the grooves 162 by a locating stud 164 and lock nut 166. The stud 164 is cross bored and threaded in a conventional manner to accept the jaw adjusting bolt 168. The jaws 160 are thus adjustable along the grooves 162 by the adjusting bolt 168 in a manner similar to a standard 4-jaw lathe chuck. When the jaws 160 are adjusted to the proper position for aligning and securing the lathe 10 on the member 11, the locknut 166 for each jaw 160 is tightened to secure each jaw in a fixed position.

An auxiliary motorized rotary spindle 170 (shown in FIG. 3) mountable in the tool holder is utilized for generating keyways and/or splines on the member 11. The carrier 70 (and the holder ring 90) are maintained in a fixed non-rotative position when the spindle 170 is used. A threaded locking stud 172 is fitted in a threaded bore 174 in the frame 54 provides the means for locking the carrier 70 in a non-rotative position. The carrier 70 is rotated to position the tool holder ring 90 in the desired position and the threaded stud is screwed in to abut the surface of the carrier 70 to hold the carrier in non-rotative position. The main drive motor of course is not utilized when using this option and the swing arm 126 is pivoted to the neutral position. The motorized spindle is engaged and motion to the carriage is provided by manual rotation of the leadscrews 144, 146 by the handwheel 154.

If desired, an indexing plate arrangement may be installed on the carrier on the end opposite the tool holder ring 90 for indexing the carrier a desired number of degrees. Indexing plates are well known in the art and therefore will not be detailed.

A tailstock assembly as shown in FIG. 10 is utilized when mounting the lathe on the end of the member to be machined. The tailstock assembly engages the end of the member to provide support to one end of the lathe 10 and aids in aligning the lathe on the member. The tailstock assembly includes a stepped flange 182 that will fit in the bore 24 of the end housing 12. The flange 182 is held in place by the adjustable jaws 160 fitting in the pocket (see FIG. 11) defined by the groove 186 and the circular step 188. An elongate threaded screw 184 having a tapered end fits in a threaded center bore of the flange 182. The opposite end of the screw 184 has machined flats, such as a square or hexagon, for adjustment purposes. The screw 184 is adjusted so the tapered end of the screw 184 engages the end of the member to be machined and the screw 184 is secured in position by locknut 190. The tailstock assembly is also mountable in the bore 36 of the end housing 14.

OPERATION

It will be understood that the apparatus of the invention is particularly adapted for machining a mid-section of a shaft. Rather than slide the apparatus onto the shaft from one end, the apparatus is prepared for sliding it sideways onto the shaft. Sections 26 and 38 are removed from the end housings 12 and 14. Similarly, sections 52 are removed from the carriage 40 and carrier 70 (including gear 80 and ring 90) is split into its two sections.

The section of the shaft to be machined (e.g. a damaged section) is identified and the end housings 12, 14 are positioned to straddle that section, i.e. the end housings are positioned on non-damaged sections on either side. The apparatus is slid sideways onto the shaft and sections 26 and 38 are replaced onto the end housings.

Next the end housings need to be oriented so that the guide ways 16, 18, 20 and 22 are generally aligned with the shaft axis. The jaws 160 slidably fitted to groove 162 in the end housings 12, 14 and the removable sections 26 and 38 accomplishes this orientation. Next the split sections 70 are assembled into a single unit and the support struts 52 are replaced on the carriage 40.

The final adjustment is preferably made utilizing the tool holder, feeler gauges and finally a dial indicator. A gauge block (such as a turning tool reverse mounted) is mounted in the adjustable tool holder and is adjusted to be near a known reference surface on the periphery of the member to be machined. It is preferable to have three angularly spaced "clock" reference (clock reference being a typical reference guide for angular position, e.g., 4 o'clock, 8 o'clock, etc.) positions, having the same radial distance from the longitudinal axis of the shaft, near each end housing. The jaws are adjusted to bring the gauge block equidistant from each reference surface, checking the distance by the feeler gauge. The final adjustment is made utilizing the dial indicator in the adjustable tool holder. The jaws are adjusted until the same reading on the dial indicator is obtained at each "clock" reference position. Those skilled in the art will appreciate that the adjustment requirement is partially dependent on the required machining tolerances permitted on the member to be machined.

Depending on the function to be performed, the appropriate cutting tool is installed in the adjustable tool holder. For example, a turning tool is inserted into the tool holder 92. Split nuts 96, 98 are disengaged from the leadscrews to permit the carriage to be positioned rapidly at a position just prior to the section to be machined and the turning tool is set at the desired depth by adjusting the tool holder. The split nuts are engaged with the leadscrews, the motor is engaged and the turning process is accomplished in the conventional manner.

It will be apparent to those skilled in the art that modifications may be made without departing from the spirit and scope of the invention. The invention is therefore not limited to the description and drawings detailing a preferred embodiment but is according to the appended claims.

What is claimed is:

1. A portable lathe mountable on a member for performing machining operations on the member, comprising;
   a pair of configured end housings spaced at a distance from each other, one of the end housings having a bore therethrough for receiving the member to be machined;
   multiple parallel guide ways, each of the guide ways of a length to span the distance between the housings, one end of each guide way affixed to one end housing and an opposite end of each guide way affixed to the other end housing;
   locking means for locking the end housings in a fixed relation relative to the member in a manner to establish a desired alignment with the guide ways;
   guide means having a bore therethrough for receiving the member to be machined, a tool holder for holding a machining tool mounted on said guide means, said guide means mounted on said guide ways for guiding a machining tool on a longitudinal travel path between said end members, said guide means including means for positioning the machining tool at selective angular positions around the periphery of the member for performing a machining operation at a selective angular position and along said longitudinal path of travel.

2. A portable lathe mountable on a member for performing machining operations on the member, comprising;
   a pair of configured end housings spaced at a distance from each other, each end housing having a bore therethrough for receiving the member to be machined;
   multiple parallel guide ways, each of the guide ways of a length to span the distance between the housings, one end of each guide way affixed to one end housing and an opposite end of each guide way affixed to the other end housing;
   lock means for locking the end housings to the member in a manner to establish a desired alignment with the guide ways;
   guide means having a bore therethrough for receiving the member to be machined mounted on said guide ways for guiding a machining tool on a travel path,
   said lathe mountable on the member from the end of the member with the member received in the bores of the end housings and the guide means permitting a machining operation to be performed on the member intermediate the ends of the member.

3. A portable lathe mountable on a member for performing machining operations on the member, comprising;
   a pair of configured end housings spaced at a distance from each other, each end housing having a bore therethrough for receiving the member to be machined and having a side entrance to the bore;
   multiple parallel guide ways, each of the guide ways of a length to span the distance between the housings, one end of each guide way affixed to one end housing and an opposite end of each guide way affixed to the other end housing;
   locking means for locking the end housings to the member in a manner to establish a desired alignment with the guide ways;
   guide means mounted on said guide ways for guiding a machining tool on a travel path, said guide means having a bore therethrough for receiving the member to be machined and said guide means having a removable segment providing a side opening to the bore and said segment being replaceable so as to encircle the member received,
   said lathe mountable on the member from a side of the member with the member entering the bores of the end housings and the guide means through the side openings of said bores.

4. A portable lathe as defined in claim 3, wherein;
   the guide means includes a carriage assembly having a central opening therethrough and having a side opening to the central opening, said carriage assembly slidably mounted on the guide ways and guidably moveable between the end housings on the guide ways, a tool holder ring having a bore therethrough for receiving the member to be machined, said ring rotatably mounted to the carriage assembly, a tool holder mounted on said ring for adjustably holding a machining tool, said ring having a removable segment for receiving the member to be machined and being replaceable so as to encircle the member and through rotation thereof to provide circumferential guide for guiding the machining tool in a predetermined path around the member and along the aligned guide ways.

5. A portable lathe as defined in claim 4, including;
a section removably installed in each of said housings, said section filling the side opening of the housing.

6. A portable lathe as defined in claim 5, wherein;
said locking means include jaws mounted on the housings and on the removable sections, said jaws independently slidable radially relative to the through bore to engage the member and through independent adjustment to establish alignment of the guide ways.

7. A portable lathe as defined in claim 6, including;
support struts removably installed on the carriage assembly, said struts installable in the side opening of the carriage assembly.

8. A portable lathe as defined in claim 7, including;
rollers mounted on the carriage and on the support struts cooperatively supporting said tool holder ring.

9. A portable lathe as defined in claim 8, including;
means for rotating the tool holder ring on the carriage assembly.

10. A portable lathe as defined in claim 9, including;
a leadscrew rotatably supported on the end housings;
a nut mounted on the carriage assembly, said nut engageable with said leadscrew;
means for rotating the leadscrew; and
said nut engaging said leadscrew moves said carriage assembly on the ways between the housings when said leadscrew rotates.

11. A portable lathe as defined in claim 10, including;
a second leadscrew rotatably supported on the end housings;
a second nut mounted on the carriage assembly, the second nut engaging the second leadscrew and,
the leadscrews coupled to each other to rotate in unison.

12. A portable lathe as defined in claim 11, including;
a tailstock assembly mountable on one of said end housings.

* * * * *